(12) United States Patent
Frankel et al.

(10) Patent No.: US 7,674,514 B2
(45) Date of Patent: Mar. 9, 2010

(54) MULTIPLE LAYERED MEMBRANE WITH THIN FLUORINE CONTAINING POLYMER LAYER

(76) Inventors: Thomas E Frankel, 4 Tucker Dr., Poughkeepsie, NY (US) 12603; Seoungil Kang, 4 Tucker Dr., Poughkeepsie, NY (US) 12603; Todd D Ritter, 4 Tucker Dr., Poughkeepsie, NY (US) 12603; Hong-suk Kim, 106-501 Dongwan Apt., Jung-Wang Dong, Shihung City (KR)

( * ) Notice: Subject to any disclaimer, the term of this patent is extended or adjusted under 35 U.S.C. 154(b) by 741 days.

(21) Appl. No.: 11/164,729

(22) Filed: Dec. 2, 2005

(65) Prior Publication Data

US 2007/0128394 A1 Jun. 7, 2007

(51) Int. Cl.
- *B32B 3/24* (2006.01)
- *B01F 3/04* (2006.01)
- *F16L 11/04* (2006.01)
- *B32B 27/08* (2006.01)

(52) U.S. Cl. .................. 428/131; 428/36.8; 428/36.91; 428/136; 428/137; 428/422; 428/476.3; 428/519; 261/122.2; 261/124; 261/DIG. 70

(58) Field of Classification Search ............. 428/195.1, 428/36.8, 36.91, 131, 136, 137, 422, 476.3, 428/519; 261/121.1, 122.2, 124, DIG. 70
See application file for complete search history.

(56) References Cited

U.S. PATENT DOCUMENTS

| 2,697,623 | A | * | 12/1954 | Mosher | 277/573 |
|---|---|---|---|---|---|
| 3,977,606 | A | * | 8/1976 | Wyss | 239/145 |
| 4,382,867 | A | * | 5/1983 | Schmit et al. | 210/754 |
| 4,555,543 | A | * | 11/1985 | Effenberger et al. | 524/520 |
| 5,034,164 | A | * | 7/1991 | Semmens | 261/122.1 |
| 5,168,107 | A | | 12/1992 | Tannenbaum | |
| 5,262,096 | A | * | 11/1993 | Egashira | 261/122.1 |
| 5,368,315 | A | * | 11/1994 | Viksne | 277/592 |
| 5,410,925 | A | * | 5/1995 | Mueller | 83/30 |
| 5,922,468 | A | * | 7/1999 | Huesmann et al. | 428/422 |
| 6,436,285 | B1 | * | 8/2002 | Kerfoot | 210/199 |
| 6,543,753 | B1 | | 4/2003 | Tharp | 261/122 |
| 6,596,357 | B1 | | 7/2003 | Marvil et al. | 428/369 |
| 6,753,087 | B2 | | 6/2004 | Jing et al. | 428/421 |
| 6,759,129 | B2 | | 7/2004 | Fukushi | 428/421 |
| 6,794,027 | B1 | | 9/2004 | Araki et al. | 428/336 |
| 2003/0203183 | A1 | * | 10/2003 | Hester et al. | 428/315.5 |
| 2005/0003204 | A1 | | 1/2005 | Frankel et al. | 428/421 |

FOREIGN PATENT DOCUMENTS

JP 10230134 A * 9/1998

OTHER PUBLICATIONS

Machine translation of JP 10-230134 A, Sep. 1998.*
D. Rosso et al., "Time-Variation of Transfer Efficiency and Headloss for Fine-Pore Membrane Diffusers in Aeration Systems," Proceedings of WEFTEC 2007, pp. 7944-7958, Water Environment Federation, 2007.

* cited by examiner

*Primary Examiner*—Mark Ruthkosky
*Assistant Examiner*—Gerard T Higgins
(74) *Attorney, Agent, or Firm*—Law Offices of Michael L. Wise, LLC

(57) ABSTRACT

A multi-layer membrane includes a fluorine containing layer and a substrate which are joined through spray coating and heat treatment in a multi-step technique.

9 Claims, 2 Drawing Sheets

MULTIPLE LAYERED MEMBRANE WITH THIN FLUORINE CONTAINING POLYMER LAYER

FIELD OF THE INVENTION

This patent applies to an improvement in the invention filed under U.S. Pat. No. 7,396,499, in which a thin-film fluorine containing layer of 0.3 mm or less was bonded through cross linking in a mold to substrate such as ethylene propylene diene monomer (EPDM) or nitrile rubber to improve upon the substrate's physical and chemical resistance properties. The improvements in the invention are that the surface of the fluorine containing layer can be made smoother through the application of a spray-coated fluorine containing layer rather than through the previous molding method, and that the fluorine containing layer has been specifically formulated to optimize the efficiency of the product. The previous method did not offer such flexibility in formulation.

BACKGROUND OF THE INVENTION

Spray coating methods of applying fluorine containing dispersions onto substrates such as EPDM and nitrile rubber already exist. They are typically combined with primers such as but not limited to polyamide-imide, polyether sulfones and sprayed onto a substrate that may have been pretreated with methyl-ethyl ketone, N-methyl pyrrolidone, plasma or corona treatment to improve adhesion of the primer to the substrate. Following surface preparation and priming, they are coated with a fluorine containing dispersion coating, and are then cured on-line or off-line in an oven. However such methods have not previously been applied to a diffuser membrane for use in water treatment plants, which is a difficult application.

This improvement is of particular importance in application of such a coating to a diffuser membrane used in the sewage and industrial wastewater treatment industries. Diffuser membranes are typically made from perforated non-fluorinated elastomers or polymers, which are perforated with small slits and, when inflated, produce a plume of bubbles which are released into wastewater. The efficacy of such diffusers is measured primarily in their ability to produce small bubbles in great quantity, such that the combined surface area of the bubbles is large. A large quantity of small bubbles transfers much more oxygen to the process than do a smaller quantity of large bubbles and oxygen mass transfer is desirable. Manufacturers of diffusers typically spend a great deal of time and energy formulating elastomeric compounds that produce small bubbles. The slightest compound formulation change may result in a vastly different bubble size. Furthermore, where diffuser membranes are submerged in dirty water, surface contamination from foulants such as biofilm, calcium and gypsum can cause an increase in bubble size over time, just as fats, oils, greases and solvents can penetrate traditional membranes causing chemical oxidation of the rubber. This can result in either a failed part or increased bubble size. The coating of a non fluorine containing membrane with a smooth fluorinated layer that is specifically designed to produce small bubbles, and to withstand thousands of perforations and a constant state of flux while submerged in wastewater is a novel invention and provides a universal solution to both fouling and efficiency issues.

SUMMARY OF THE INVENTION

The present invention applies to flexible diffuser membranes which are used in the aeration of wastewater and which is spray coated with a fluorine containing surface layer.

A diffuser membrane is produced from blended EPDM rubber, nitrile rubber, or neoprene rubber, the surface is roughened through a corona, a plasma, or methyl-ethyl ketone, and primer and fluorine containing surface layers are applied through spray coating. Alternatively, a blended primer and fluorine containing surface layer is applied through spray coating.

When treated in this way, the membrane becomes significantly more resistant to surface fouling, chemical oxidation, and its oxygen transfer efficiency is acceptably high by industry standards.

DETAILED DESCRIPTION

Figure 1:
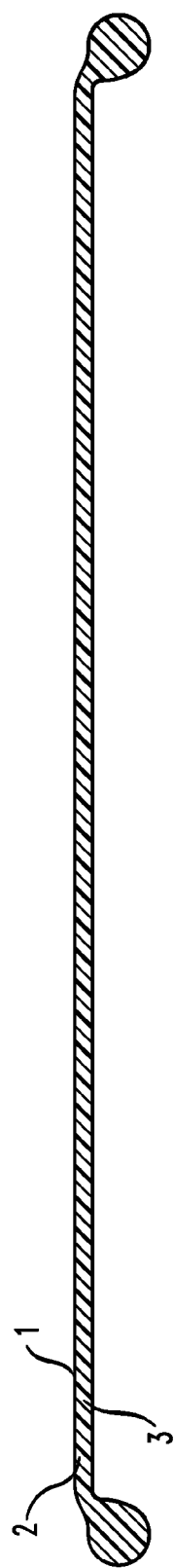
FIG. 1 is a cross-sectional view of a multi layered disc membrane.
Figure 2:
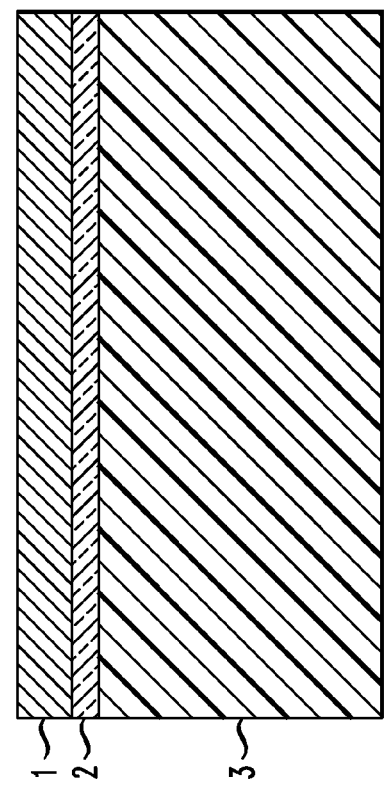
FIG. 2 is a cross-sectional view of a membrane onto which layers have been applied.
Figure 3:
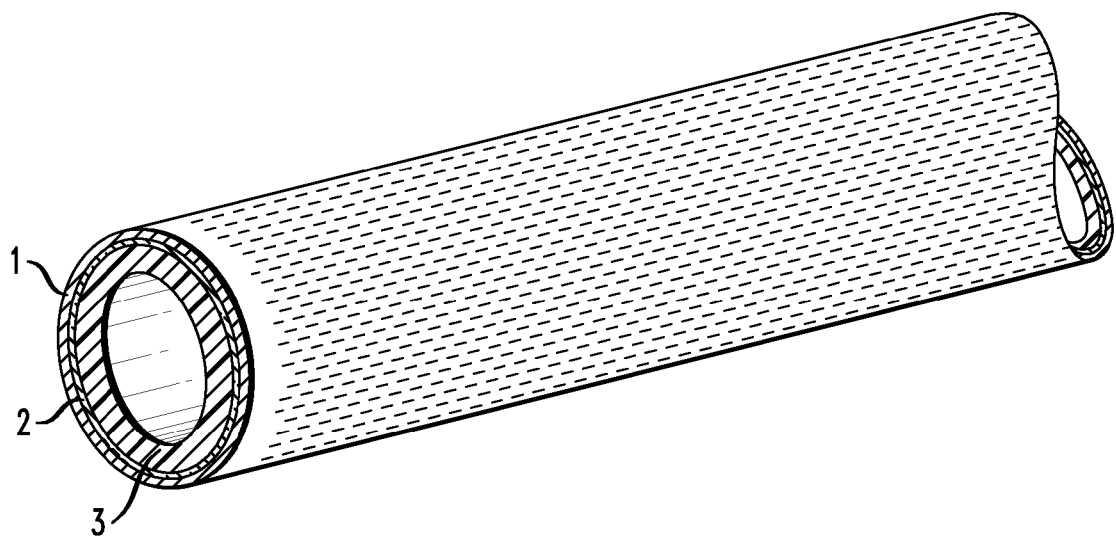
FIG. 3 is a cutaway view of a multi layered tube membrane.

Adhesion between a spray coated fluorine containing layer and a substrate is accomplished through substrate surface treatment, priming, coating, and curing.

Firstly, a substrate layer such as membrane 3 is molded.

Secondly, a roughening agent such as a corona, a plasma, methyl-ethyl ketone or N-methyl pyrrolidone is applied to the surface to be coated as needed depending on the quality of the substrate.

Thirdly, a primer layer 2 of less than 10 microns is sprayed onto the substrate surface. This primer is then heat treated at >100 degrees C. for >15 minutes. The primer layer may contain polyamide-imide or polyether sulfone. Alternatively, the primer is blended with a fluorine containing dispersion layer and this layer is sprayed onto the substrate surface, then heat treated.

Fourthly, if using separate primer and fluorine containing dispersion layers, the fluorine containing dispersion layer 1 of less than 20 microns is sprayed over the cured primer, and is heat treated at >120 degrees C. for >20 minutes. The fluorine containing dispersion layer may contain fluoride acryl resin, xylene, toluene, bentonite, titanium dioxide, carbon black, 2-isocyanatoethyl 2,6-diisocyanatohexanoate, 2,6-diisocyanatohexanoic acid 2-isocyanato ethyl ester and/or ethyl acetate.

From the foregoing it will be seen that this invention is one well adapted to attain all ends and objectives hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A multi-layer flexible perforated diffuser membrane comprising:
   a substrate layer, wherein said substrate layer comprises ethylene propylene diene monomer (EPDM);
   a primer layer disposed on said substrate layer; and
   a dispersion layer disposed on said primer layer, wherein said dispersion layer comprises polytetrafluoroethylene (PTFE);
   wherein said substrate layer, said primer layer and said dispersion layer are perforated to form said multi-layer flexible perforated diffuser membrane.

2. The diffuser membrane of claim 1, wherein said primer layer is less than 10 microns thick.

3. The diffuser membrane of claim 1, wherein said diffuser membrane is selected from the group consisting of a tubular shaped membrane, a disc shaped membrane and a panel shaped membrane.

4. The diffuser membrane of claim 1, wherein said primer layer comprises a material selected from the group consisting of polyamide-imide and polyether sulfone.

5. The diffuser membrane of claim 1, wherein said dispersion layer is less than 20 microns thick.

6. The diffuser membrane of claim 1, wherein said dispersion layer is less than 20 microns thick and said dispersion layer is heat treated at a temperature of greater than 120 degrees C. prior to the use of the diffuser membrane.

7. The diffuser membrane of claim 1, wherein said dispersion layer further comprises a material selected from the group consisting of fluoride acryl resin, xylene, toluene, bentonite, titanium dioxide, carbon black, 2-isocyanatoethyl 2,6-diisocyanatohexanoate, 2,6-diisocyanatohexanoic acid 2-isocyanatoethyl ester and ethyl acetate.

8. The diffuser membrane of claim 1, wherein said dispersion layer is deposited through a spray.

9. The diffuser membrane of claim 1, wherein a plasma discharge, a corona discharge, N-methyl pyrrolidone or methyl-ethyl ketone is applied to said substrate layer prior to deposition of said primer layer.

* * * * *